US012184335B2

United States Patent
Nguyen et al.

(10) Patent No.: US 12,184,335 B2
(45) Date of Patent: Dec. 31, 2024

(54) INTEGRATED CIRCUIT BASED AC COUPLING TOPOLOGY

(71) Applicant: MACOM Technology Solutions Holdings, Inc., Lowell, MA (US)

(72) Inventors: Baotoan Nguyen, Lowell, MA (US); Stefano D'Agostino, Los Altos, CA (US); Toshi Omori, Lowell, MA (US); Ashok K. Verma, Los Gatos, CA (US)

(73) Assignee: MACOM Technology Solutions Holdings, Inc., Lowell, MA (US)

( * ) Notice: Subject to any disclaimer, the term of this patent is extended or adjusted under 35 U.S.C. 154(b) by 759 days.

(21) Appl. No.: 17/058,629

(22) PCT Filed: May 30, 2019

(86) PCT No.: PCT/US2019/034730
§ 371 (c)(1),
(2) Date: Nov. 24, 2020

(87) PCT Pub. No.: WO2019/232260
PCT Pub. Date: Dec. 5, 2019

(65) Prior Publication Data
US 2021/0211204 A1 Jul. 8, 2021

Related U.S. Application Data

(60) Provisional application No. 62/678,164, filed on May 30, 2018.

(51) Int. Cl.
*H04B 10/564* (2013.01)
(52) U.S. Cl.
CPC .................. *H04B 10/564* (2013.01)
(58) Field of Classification Search
CPC .................................................... H04B 10/564
(Continued)

(56) References Cited

U.S. PATENT DOCUMENTS 4,488,305 A 12/1984 Claverie
4,534,064 A 8/1985 Giacometti et al.
(Continued)

FOREIGN PATENT DOCUMENTS

CN 101366151 A 2/2009
CN 10-2386863 3/2012
(Continued)

OTHER PUBLICATIONS

"An Introduction to DVD Recordable (DVD-R) What is DVD Recordable?" http://www.dvd-copy.com/reference/dvd_recordable.html, 2004, 8 pages.
(Continued)

*Primary Examiner* — Joseph Chang
(74) *Attorney, Agent, or Firm* — Weide & Miller, Ltd.

(57) ABSTRACT

A coupling system in an integrated circuit to block DC components from an amplifier without large costly external coupling capacitors. An input receives an input signal which has a DC component. A first impedance element receives the input signal and blocks the DC component while a second impedance element connects between the output of the first impedance matching element and a ground node. The second impedance element and the first impedance element form a voltage divider network. The first and second impedance element are integrated elements. The amplifier receives the input signal after the DC component is blocked. The first impedance element and the second impedance element may comprise a resistor in series with a capacitor. In a differential pair configuration, an impedance matching element interconnects between a first path and a second path to impedance match the amplifier to a data source.

11 Claims, 7 Drawing Sheets (58) Field of Classification Search
USPC .................................................... 307/109
See application file for complete search history.

(56) References Cited

U.S. PATENT DOCUMENTS

| | | | |
|---|---|---|---|
| 4,545,078 A | 10/1985 | Wiedeburg | |
| 4,687,937 A | 8/1987 | Galvin et al. | |
| 4,709,416 A | 11/1987 | Patterson | |
| 4,734,914 A | 3/1988 | Yoshikawa | |
| 4,747,091 A | 5/1988 | Doi | |
| 4,864,649 A | 9/1989 | Tajima et al. | |
| 5,019,769 A | 5/1991 | Levinson | |
| 5,039,194 A | 8/1991 | Block et al. | |
| 5,057,932 A | 10/1991 | Lang | |
| 5,334,826 A | 8/1994 | Sato et al. | |
| 5,383,046 A | 1/1995 | Tomofuji et al. | |
| 5,383,208 A | 1/1995 | Queniat et al. | |
| 5,392,273 A | 2/1995 | Masaki et al. | |
| 5,394,416 A | 2/1995 | Ries | |
| 5,396,059 A | 3/1995 | Yeates | |
| 5,448,629 A | 9/1995 | Bosch et al. | |
| 5,471,501 A | 11/1995 | Parr et al. | |
| 5,488,627 A | 1/1996 | Hardin et al. | |
| 5,491,548 A | 2/1996 | Bell et al. | |
| 5,510,924 A | 4/1996 | Terui et al. | |
| 5,532,471 A | 7/1996 | Khorramabadi et al. | |
| 5,557,437 A | 9/1996 | Sakai et al. | |
| 5,574,435 A | 11/1996 | Mochizuki et al. | |
| 5,594,748 A | 1/1997 | Jabr | |
| 5,636,254 A | 6/1997 | Hase et al. | |
| 5,673,282 A | 9/1997 | Wurst | |
| 5,710,660 A | 1/1998 | Yamamoto et al. | |
| 5,812,572 A | 9/1998 | King et al. | |
| 5,822,099 A | 10/1998 | Takamatsu | |
| 5,831,959 A | 11/1998 | Sakanushi | |
| 5,844,928 A | 12/1998 | Shastri et al. | |
| 5,900,959 A | 5/1999 | Noda et al. | |
| 5,912,694 A | 6/1999 | Miyake | |
| 5,926,303 A | 7/1999 | Giebel et al. | |
| 5,943,152 A | 8/1999 | Mizrahi et al. | |
| 5,953,690 A | 9/1999 | Lemon et al. | |
| 5,956,168 A | 9/1999 | Levinson et al. | |
| 5,978,393 A | 11/1999 | Feldman et al. | |
| 6,010,538 A | 1/2000 | Sun et al. | |
| 6,014,241 A | 1/2000 | Winter et al. | |
| 6,020,593 A | 2/2000 | Chow et al. | |
| 6,021,947 A | 2/2000 | Swartz | |
| 6,023,147 A | 2/2000 | Cargin, Jr. et al. | |
| 6,049,413 A | 4/2000 | Taylor et al. | |
| 6,064,501 A | 5/2000 | Roberts et al. | |
| 6,081,362 A | 6/2000 | Hatakeyama et al. | |
| 6,108,113 A | 8/2000 | Fee | |
| 6,111,687 A | 8/2000 | Tammela | |
| 6,115,113 A | 9/2000 | Flockencier | |
| H1881 H | 10/2000 | Davis et al. | |
| 6,160,647 A | 12/2000 | Gilliland et al. | |
| 6,175,434 B1 | 1/2001 | Feng | |
| 6,259,293 B1 | 7/2001 | Hayase et al. | |
| 6,262,781 B1 | 7/2001 | Deter | |
| 6,282,017 B1 | 8/2001 | Kinoshita | |
| 6,292,497 B1 | 9/2001 | Nakano | |
| 6,333,895 B1 | 12/2001 | Hamamoto et al. | |
| 6,366,373 B1 | 4/2002 | MacKinnon et al. | |
| 6,397,090 B1 | 5/2002 | Cho | |
| 6,423,963 B1 | 7/2002 | Wu | |
| 6,452,719 B2 | 9/2002 | Kinoshita | |
| 6,473,224 B2 | 10/2002 | Dugan et al. | |
| 6,494,370 B1 | 12/2002 | Sanchez | |
| 6,504,857 B1 | 1/2003 | Iwazaki | |
| 6,512,617 B1 | 1/2003 | Tanji et al. | |
| 6,535,187 B1 | 3/2003 | Wood | |
| 6,556,601 B2 | 4/2003 | Nagata | |
| 6,563,848 B1 | 5/2003 | Iwazaki | |
| 6,570,944 B2 | 5/2003 | Best et al. | |
| 6,580,328 B2 | 6/2003 | Tan et al. | |
| 6,597,485 B1 | 7/2003 | Ikeuchi | |
| 6,657,488 B1 | 12/2003 | King et al. | |
| 6,661,940 B2 | 12/2003 | Kim | |
| 6,704,008 B2 | 3/2004 | Naito et al. | |
| 6,707,600 B1 | 3/2004 | Dijaili et al. | |
| 6,720,826 B2 | 4/2004 | Yoon | |
| 6,740,864 B1 | 5/2004 | Dries | |
| 6,801,555 B1 | 10/2004 | DiJaili et al. | |
| 6,828,857 B2 | 12/2004 | Paillet et al. | |
| 6,836,493 B2 | 12/2004 | Mahowald et al. | |
| 6,837,625 B2 | 1/2005 | Schott et al. | |
| 6,852,966 B1 | 2/2005 | Douma et al. | |
| 6,862,047 B2 | 3/2005 | Hibi | |
| 6,864,751 B1 | 3/2005 | Schmidt et al. | |
| 6,868,104 B2 | 3/2005 | Stewart et al. | |
| 6,879,217 B2 | 4/2005 | Visocchi | |
| 6,888,123 B2 | 5/2005 | Douma et al. | |
| 6,909,731 B2 | 6/2005 | Lu | |
| 6,934,307 B2 | 8/2005 | DeCusatis et al. | |
| 6,934,479 B2 | 8/2005 | Sakamoto et al. | |
| 6,941,077 B2 | 9/2005 | Aronson et al. | |
| 6,952,531 B2 | 10/2005 | Aronson et al. | |
| 6,956,643 B2 | 10/2005 | Farr et al. | |
| 6,957,021 B2 | 10/2005 | Aronson et al. | |
| 6,967,320 B2 | 11/2005 | Chieng et al. | |
| 7,005,901 B1 | 2/2006 | Jiang et al. | |
| 7,031,574 B2 | 4/2006 | Huang et al. | |
| 7,039,082 B2 | 5/2006 | Stewart et al. | |
| 7,046,721 B2 | 5/2006 | Grohn | |
| 7,049,759 B2 | 5/2006 | Roach | |
| 7,050,720 B2 | 5/2006 | Aronson et al. | |
| 7,058,310 B2 | 6/2006 | Aronson et al. | |
| 7,065,114 B2 | 6/2006 | Hishiyama | |
| 7,066,746 B1 | 6/2006 | Togami et al. | |
| 7,079,775 B2 | 7/2006 | Aronson et al. | |
| 7,127,391 B2 | 10/2006 | Chang et al. | |
| 7,181,100 B2 | 2/2007 | Douma et al. | |
| 7,184,671 B2 | 2/2007 | Wang | |
| 7,193,957 B2 | 3/2007 | Masui et al. | |
| 7,206,023 B2 | 4/2007 | Belliveau | |
| 7,215,891 B1 | 5/2007 | Chiang et al. | |
| 7,233,206 B2 | 6/2007 | Murakami et al. | |
| 7,265,334 B2 | 9/2007 | Draper et al. | |
| 7,276,682 B2 | 10/2007 | Draper et al. | |
| 7,357,513 B2 | 4/2008 | Watson et al. | |
| 7,381,935 B2 | 6/2008 | Sada et al. | |
| 7,400,662 B2 | 7/2008 | Robinson | |
| 7,403,064 B2 | 7/2008 | Chou et al. | |
| 7,453,475 B2 | 11/2008 | Nitta et al. | |
| 7,502,400 B2 | 3/2009 | Preisach | |
| 7,504,610 B2 | 3/2009 | Draper | |
| 7,741,908 B2 | 6/2010 | Furuta | |
| 7,768,353 B2 | 8/2010 | Chang | |
| 8,073,030 B2 | 12/2011 | Moto | |
| 8,094,692 B2 | 1/2012 | Nakamura | |
| 8,548,336 B2 | 10/2013 | Nuttgens | |
| 9,306,609 B1 | 4/2016 | Lacroix | |
| 9,419,410 B2 | 8/2016 | Usuki | |
| 2001/0046243 A1 | 11/2001 | Schie | |
| 2002/0015305 A1 | 2/2002 | Bornhorst et al. | |
| 2002/0064193 A1 | 5/2002 | Diaz | |
| 2002/0085600 A1 | 7/2002 | Jung | |
| 2002/0105982 A1 | 8/2002 | Chin et al. | |
| 2002/0130977 A1 | 9/2002 | Hibi | |
| 2002/0140378 A1 | 10/2002 | Volk et al. | |
| 2002/0181533 A1 | 12/2002 | Vail | |
| 2003/0030756 A1 | 2/2003 | Kane et al. | |
| 2003/0043869 A1 | 3/2003 | Vaughan | |
| 2003/0053003 A1 | 3/2003 | Nishi et al. | |
| 2003/0067662 A1 | 4/2003 | Brewer et al. | |
| 2003/0122057 A1 | 7/2003 | Han et al. | |
| 2004/0032890 A1 | 2/2004 | Murata | |
| 2004/0047635 A1 | 3/2004 | Aronson et al. | |
| 2004/0095976 A1 | 5/2004 | Bowler et al. | |
| 2004/0114650 A1 | 6/2004 | Tanaka | |
| 2004/0136727 A1 | 7/2004 | Androni et al. | |
| 2004/0160996 A1 | 8/2004 | Giorgi | |
| 2004/0202215 A1 | 10/2004 | Fairgrieve | |

(56) References Cited

U.S. PATENT DOCUMENTS

| | | | |
|---|---|---|---|
| 2004/0208207 A1* | 10/2004 | Kasper | H04B 10/504 372/26 |
| 2004/0240041 A1 | 12/2004 | Tian et al. | |
| 2004/0258115 A1 | 12/2004 | Murata | |
| 2005/0024142 A1 | 2/2005 | Sowlati | |
| 2005/0062530 A1 | 3/2005 | Bardsley et al. | |
| 2005/0094737 A1 | 5/2005 | Vorenkamp | |
| 2005/0105574 A1 | 5/2005 | Wu | |
| 2005/0180280 A1 | 8/2005 | Hoshino et al. | |
| 2005/0185149 A1 | 8/2005 | Lurkens et al. | |
| 2005/0215090 A1 | 9/2005 | Harwood | |
| 2005/0243879 A1 | 11/2005 | Horiuchi | |
| 2006/0038631 A1 | 2/2006 | Yetter et al. | |
| 2006/0114954 A1 | 6/2006 | Wong et al. | |
| 2006/0125557 A1 | 6/2006 | Manstretta | |
| 2006/0192899 A1 | 8/2006 | Ogita | |
| 2006/0239308 A1 | 10/2006 | Husain | |
| 2006/0261893 A1 | 11/2006 | Chiang et al. | |
| 2006/0280211 A1 | 12/2006 | Garez | |
| 2007/0047602 A1 | 3/2007 | Tanaka | |
| 2007/0058089 A1 | 3/2007 | Wang | |
| 2007/0081130 A1 | 4/2007 | May et al. | |
| 2007/0098026 A1 | 5/2007 | Uesaka et al. | |
| 2007/0159434 A1 | 7/2007 | Yen et al. | |
| 2007/0188227 A1 | 8/2007 | Maejima | |
| 2007/0195208 A1 | 8/2007 | Miyazawa et al. | |
| 2007/0229718 A1 | 10/2007 | Hall | |
| 2007/0263685 A1 | 11/2007 | Takasou | |
| 2007/0286609 A1 | 12/2007 | Ikram et al. | |
| 2008/0012508 A1 | 1/2008 | Steele et al. | |
| 2008/0024469 A1 | 1/2008 | Damera-Venkata et al. | |
| 2008/0055005 A1 | 3/2008 | Nam et al. | |
| 2008/0074562 A1 | 3/2008 | Endo et al. | |
| 2008/0231209 A1 | 9/2008 | Shiwaya et al. | |
| 2008/0246893 A1 | 10/2008 | Boss et al. | |
| 2008/0303499 A1 | 12/2008 | Chen et al. | |
| 2008/0309407 A1 | 12/2008 | Nakamura et al. | |
| 2009/0108935 A1 | 4/2009 | Kuo et al. | |
| 2009/0238226 A1 | 9/2009 | Moto | |
| 2010/0164396 A1 | 7/2010 | Lindeberg et al. | |
| 2010/0172384 A1 | 7/2010 | Groepl | |
| 2010/0183318 A1 | 7/2010 | Tanaka | |
| 2010/0284452 A1 | 11/2010 | Allen | |
| 2011/0062874 A1 | 3/2011 | Knapp | |
| 2011/0273248 A1 | 11/2011 | Nicolson et al. | |
| 2012/0133414 A1 | 5/2012 | Zhuang | |
| 2012/0262235 A1 | 10/2012 | Hoogzaad | |
| 2013/0002347 A1 | 1/2013 | Beukema et al. | |
| 2013/0278338 A1 | 10/2013 | Temporiti Milani et al. | |
| 2014/0023374 A1 | 1/2014 | Yuda | |
| 2014/0063593 A1 | 3/2014 | Berendt | |
| 2014/0226147 A1 | 8/2014 | Metzler | |
| 2014/0233594 A1 | 8/2014 | Kubo | |
| 2015/0295547 A1 | 10/2015 | Blednov | |
| 2016/0013955 A1 | 1/2016 | Dong | |
| 2016/0173299 A1* | 6/2016 | Islam | H04L 25/0296 375/232 |
| 2016/0190993 A1 | 6/2016 | Nobbe et al. | |
| 2016/0254793 A1 | 9/2016 | Su et al. | |
| 2017/0085057 A1 | 3/2017 | Barnes | |
| 2017/0237462 A1 | 8/2017 | Burgener et al. | |
| 2017/0288618 A1 | 10/2017 | Asmanis | |

FOREIGN PATENT DOCUMENTS

| | | |
|---|---|---|
| CN | 103548270 A | 1/2014 |
| CN | 10-4126158 | 10/2014 |
| CN | 10-5897208 | 8/2016 |
| EP | 0606161 | 4/2000 |
| EP | 1471671 | 12/2004 |
| JP | 05-152660 | 6/1993 |
| JP | 2004-045989 | 2/2004 |
| JP | 2009060361 | 3/2009 |
| JP | 2011-121545 | 6/2011 |
| JP | 2001-119250 | 4/2015 |
| KR | 10-2004-0107996 | 6/2006 |
| KR | 10-1690431 | 12/2016 |
| WO | WO 93/21706 | 10/1993 |
| WO | WO 02/063800 | 8/2002 |
| WO | WO 2004/098100 | 11/2004 |

OTHER PUBLICATIONS

"CD Basics: The Bumps", Howstuffworks "How CD Burners Work", http://entertainment.howstuffworks.com/cd-burner1.htm, 2004, 3 pages.

"Linear Technology LCT 3533 2A Wide Input Voltage Synchronous Buck-Boost DC/DC Converter", © Linear Technology Corporation 2007, 16 pages.

"National Semiconductor LM 3549 High Power Sequential LED Driver", © 2010 National Semiconductor Corporation, www.national.com, Aug. 3, 2010, 20 pages.

"TPS63020 TPS63021 High Efficiency Single Inductor Buck-Boost Converter With 4-A Switches", Texas Instruments, Copyright © 2010, Texas Instruments Incorporated, Apr. 2010, 28 pages.

"Current mirror" Wikipedia, the free encyclopedia, http://en.wikipedia.org/wiki/Current_mirror, May 22, 2011, 8 pages.

"LT3476-High Current Quad Output LED Driver" Linear Technology, http://www.linear.com/product/LT3476, © 2010 Linear Technology, 14 pages.

"Mosfet" Wikipedia, the free encyclopedia, http://en.wikipedia.org/wiki/MOSFET, May 27, 2011, 24 pages.

"Power Management, LED—driver considerations" Analog and Mixed-Signal Products, Analog Applications Journal, www.ti.com/sc/analogapps, Texas Instruments Incorporated, © 2005 Texas Instruments Incorporated, Michael Day, 5 pages.

Abhijit Phanse, National Semiconductor, "Exercise 2: Define the time variance of a fiber optic channel's Impulse Response, and suggest a method for measuring it", IEEE 802.3ae, Nov. 2000, 13 pages.

Dr. John Rilum, "Mastering Beyond DVD Density", http://www.optical-disc.com/beyonddvd.html, 2002, 7 pages.

Garth Nash, "AN535 Application Notes—Phase-Locked Loop Design Fundamentals", Motorola, Inc., 1994, 3 pages.

Jamie Bailey "How DVD Works", http://sweb.uky.edu/~jrbai101/dvd.htm, May 1, 1999, pages.

Keith Szolusha, "Linear Technology Design Notes DC/DC Converter Drives Lumileds White LEDs from a Variety of Power Sources-Design Note 340", Linear Technology Corporation, © Linear Technology Corporation 2004, date unknown, 2 pages.

Richard Wilkinson "Topic: Selecting the Right DVD Mastering Technique", DVD Technology Update, http://www.optical-disc.com/dvdupdate.html, 2002, 8 pages.

Ron Bertrand, "The Basics of PLL Frequency Synthesis", Online Radio & Electronics Course, Apr. 2002, 9 pages.

Tuan "Solace" Nguyen, "CD, CD-R, CD-RW, DVD, DD-RAM, DVD-RW, and MO", Tweak3D.Net-Your Freakin' Tweakin Source!, http://www.tweak3d.net/articles/opticals/, May 13, 2000, 7 pages.

"An Introduction to DVD-RW", DVD White Paper, Pioneer New Media Technologies, Inc., Feb. 8, 2001, 8 pages.

Stefan Zeltner, "Insulating IGBT driver with PCB integrated capacitive coupling elements", 2010 6th International Conference on Integrated Power Electronics System, Mar. 14, 2011, 6 pages.

International Search Report issued for Application No. PCT/US2019/034730 on Sep. 17, 2019.

European Patent Office ("EPO") Extended European Search Report issued for Application No. 19811970.3 on Mar. 23, 2022.

Japan Patent Office ("JPO") Preliminary Report issued for Application No. JP2020-566795 on Dec. 26, 2023.

* cited by examiner

INTEGRATED CIRCUIT BASED AC COUPLING TOPOLOGY

FIELD OF THE INVENTION

The invention relates to AC coupling topology, and in particular to an AC coupling arrangement located on an integrated circuit.

RELATED ART

Optical communication systems are commonly found in data centers and for long haul applications to transmit data at high data rates between two locations. Foundational to optical communication systems is the data to be transmitted, and a driver amplifier which amplifies a modulated signal onto an optical modulator. The interface between the data source and the driver must block DC signal components for preferred operation. This is typically achieved through use of an off-chip blocking capacitor.

Figure 1A:
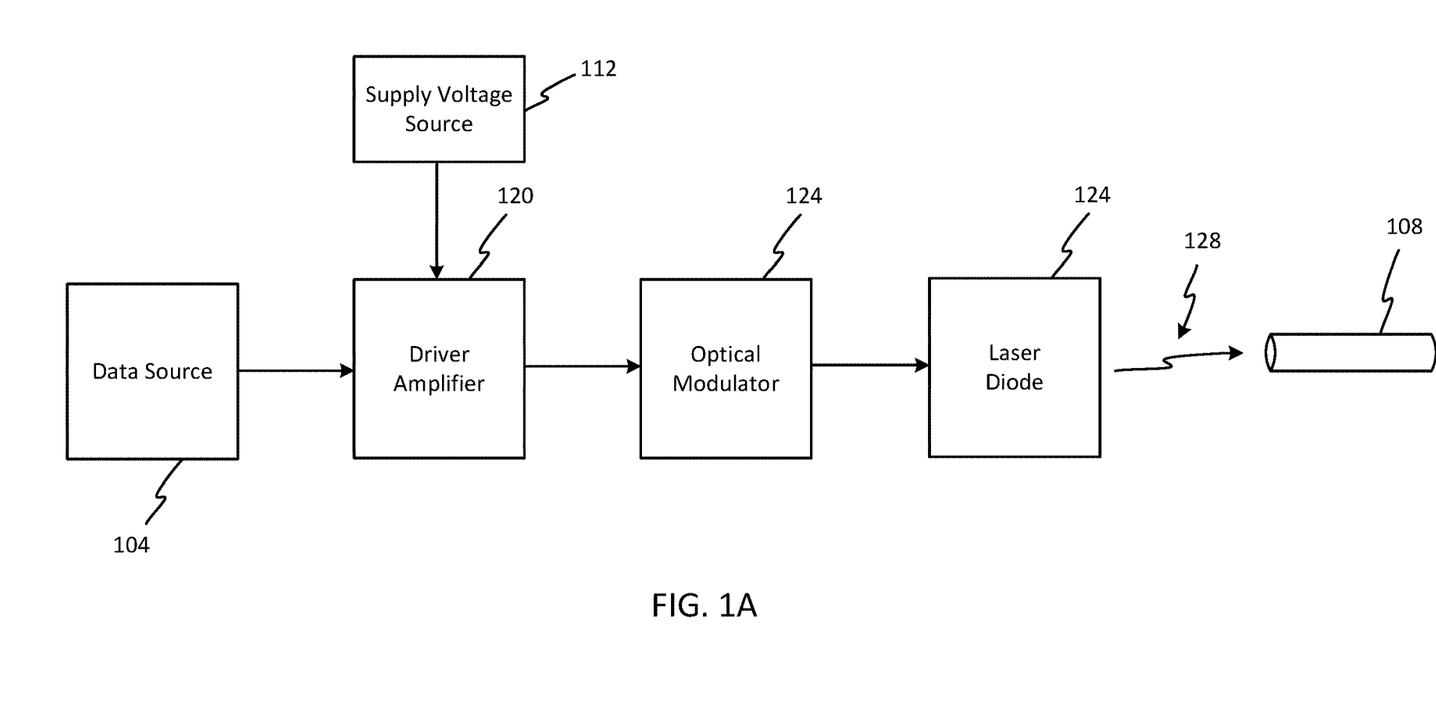
FIG. 1A is a block diagram illustrating an example environment of use of the innovation disclosed herein.

FIG. 1A illustrates a block diagram of an example environment of use, namely, an optic signal transmitter. This is but one possible environment of use and it is contemplated that other environments of use are possible. As shown in FIG. 1A, a data source 104 supplies data for transmission over an optic fiber 108. In one embodiment, the data source is a DSP. To achieve biasing of a driver, a supply voltage source 112 is provided to deliver power to the system. The supply voltage source 112 may be any source including a hard wire utility supplied power, power supply, battery, or any other source. The supply voltage source 112 provides a supply voltage to a bias circuit (part of the driver amplifier 120), which in turn provides a bias voltage to a driver amplifier 120. The driver amplifier 120 also receives the data to be transmitted in optic format from the data source 104. The driver amplifier 120 includes one or more amplifiers configured to amplify and modulate the data to a level suitable for driving an optical modulator or laser diode 124. Responsive to the signal from the driver, the optical modulator or laser diode 124 generates the optic signal 128, which is presented to the fiber optic cable 108, for transmission to a remote location, such as for example another device in a data center or to a remote location in long haul applications. The frequency range of operation can be as high as several tens of Gigahertz (e.g. 50 GHz) or higher and as low as 100 KHz.

Figure 1B:
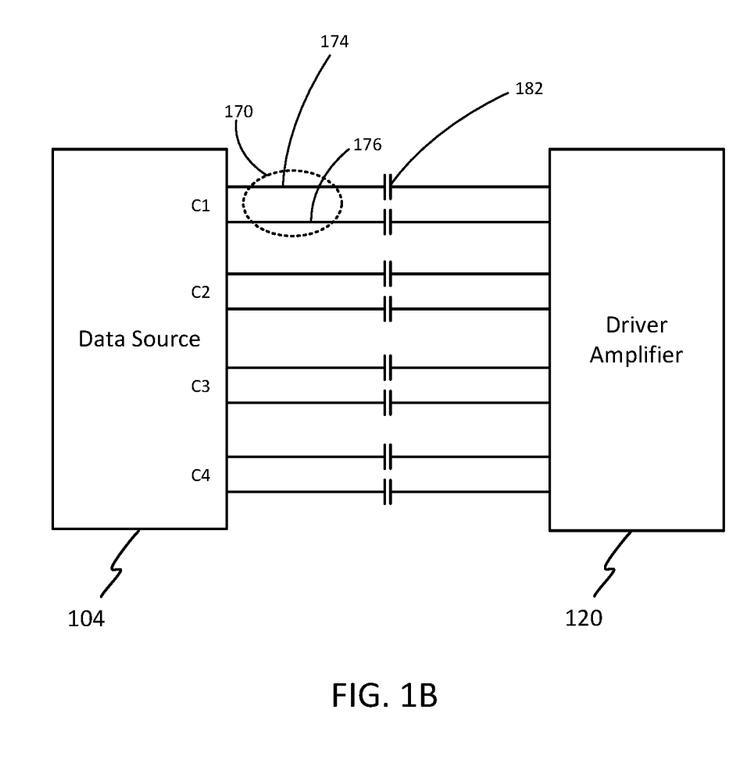
FIG. 1B is a block diagram showing the coupling capacitors.

FIG. 1B illustrates a block diagram of the interface between the data source 104 and the driver amplifier 120 that includes DC blocking capacitors. In this embodiment, there are four channels (C1, C2, C3, C4), and each channel is a differential pair 170 comprising two conductive paths, namely a positive path 174 and a negative path 176. In series in each path is a DC blocking capacitor 182 as shown. The blocking capacitors 182 function to block DC components from the signal passing from the data source 104 to the driver amplifier 120. In addition, the capacitance has to be large enough to allow the lowest frequency of operation in (e.g. 1 MHz or 100 KHz in various embodiments) without attenuating it. Furthermore, the capacitor needs to have low parasitics as to not influence the high frequency content.

Because of the aforementioned, blocking capacitors are typically external to the integrated circuit causing surface mount components to be used. As a drawback to the prior art, the blocking capacitors are large in size due to the requirement that the blocking capacitor block DC signal components yet the low pass frequency is 1 MHz. Due to the blocking capacitors being external to the integrated circuits which form the data source, the blocking capacitors are undesirably large in size. In some embodiments, the capacitor may be as large as the integrated circuit dedicated to the channel associated with the blocking capacitors. Because of the size of the blocking capacitors, the components have a large footprint consuming valuable real estate on the circuit board in contrast to technological trends which are towards smaller and more compact—not larger—configurations.

Another downside to external blocking capacitors is that high fidelity surface mount components with good frequency performance carries a premium in cost. With the differential inputs and four channels shown in FIG. 1B, eight capacitors are needed. Example sizes for these blocking capacitors are 100 nano-farad capacitance and costs range between one to two dollars each, or up to sixteen dollars for all four channels. This further increases the space requirements and increases cost which is then passed onto the customers and/or reduces profit. Another drawback is that these capacitors add to manufacture costs and can increase the failure rate due to the additional components. Any component outside of the integrated circuit requires transitions, transmission lines to connect to the component, and an assembly process leading to more parasitics, degraded performance, and increases assembly complexity.

SUMMARY

To overcome the drawbacks of the prior art and provide additional benefits, a capacitive coupling system is disclosed. In one embodiment the system is configured as part of an integrated circuit to block DC components from an amplifier comprising. The system includes an input configured to receive an input signal such that the input signal has a DC component. A voltage divider network which has an input, an output, at least one resistor and at least one capacitor is also provided. The input is configured to receive the signal having a DC component such that the voltage divider network blocks the DC component. An amplifier is provided which has an input connected to the output of the voltage divider network.

In one configuration, the voltage divider network comprises a first impedance element and a second impedance element. As such, the first impedance element and the second impedance element may comprise a resistor in series with a capacitor. In one embodiment, the amplifier includes a biasing element and the biasing element is configured to receive the input signal without the DC component. The biasing element includes a first resistor connected to a supply voltage and a second resistor connect to ground.

The capacitive coupling system may be configured for differential signals and the system thus far described is associated with a positive path. The system may further comprise a negative path input configured to receive a negative path signal which has a DC component connected. This system also includes a negative path first impedance element having an input and an output. The input is configured to receive the negative path signal having a DC component such that the negative path first impedance element blocks the DC component. The negative path also includes a second impedance element configured to connect between the output of the negative path first impedance matching element and a ground node. The negative path second impedance element, when combined with the negative path first impedance element, forms a voltage divider network. An impedance matching element is provided and connected between the input of the positive path and the negative path input. The impedance matching element is configured to match an input impedance of the amplifier to a data source. The impedance matching element may be formed from one or more resistor connected in series between the input of the positive path and the negative path input and a capacitor connected to ground.

Also disclosed herein is a capacitive coupling system configured as part of an integrated circuit for a differential pair to couple differential inputs to an amplifier. In one embodiment, the system comprises a positive path and a negative path. The positive path includes an input configured to receive a positive path input signal such that the positive path input signal has a DC component. Also part of the positive path is a first impedance element having an input and an output, the input is configured to receive the positive path input signal such that the first impedance element blocks the DC component. Also part of the positive path is a second impedance element configured to connect between the output of the first impedance matching element and a ground. The second impedance element, when combined with the first impedance element, forms a voltage divider network. An amplifier is provided which has an input connected to the output of the positive path first impedance element. The negative path includes an input configured to receive a negative path input signal which has a DC component. Also part of the negative path is a first impedance element having an input and an output. The input is configured to receive the negative path input signal such that the first impedance element blocks the DC component. A second impedance element is also provided and configured to connect between the output of the first impedance matching element and ground. The second impedance element when combined with the first impedance element forms a voltage divider network. The amplifier has an input connected to the output of the negative path first impedance element. Also part of this system is an impedance matching element connected between the positive path input and the negative path input. The impedance matching element configured to match an input impedance of the amplifier to a data source.

In one embodiment, the positive path first impedance element comprises at least resistor and at least one capacitor. It is contemplated that the at least one resistor and the at least one capacitor are in series. In one configuration, the positive path second impedance element comprises at least resistor and at least one capacitor. The positive path second impedance element at least one resistor and the at least one capacitor may be in series and connect to a ground node.

It is contemplated that the impedance matching element may comprise at least one resistor and at least one capacitor such that the capacitor is connected to ground. In this embodiment, the at least one resistor comprises two resistors connected in series between the positive path input and the negative path input forming a middle node between the two resistors and the capacitor connects to the middle node and to ground.

Also disclosed is a method for coupling an input signal, connected a data source, to a driver and blocking DC components of an input signal. This method includes receiving the input signal from a data source such that the input signal has a DC component. This method also provides the input signal to a first impedance element. The first impedance element is configured as part of an integrated circuit. Next, blocking the DC component of the input signal with the first impedance element and then providing an output from the first impedance element to a second impedance element. The second impedance element configured as part of the integrated circuit. This method also establishes the input impedance with the second impedance element and the first impedance element to create an impedance matched signal, and then provides the impedance matched signal to the driver.

In one embodiment, the input signal is a differential signal pair comprising a first signal on a first path and a second signal on a second path, the second path generally identical to the first path. The first and second path each have the first impedance element and the second impedance element and this embodiment further comprises matching the input impedance of the driver to the data course with an impedance matching element connected between the first path and the second path.

In one configuration, the first impedance element and the second impedance element each comprise at least one resistor and at least one capacitor. It is contemplated that the impedance matching element may comprises an interconnect between the first path and the second path, the interconnect having two or more resistor in series and a capacitor connect ground from the interconnect to ground. In one embodiment, this method does not include blocking DC components with a capacitor, external to the integrated circuit, located between the data course and the driver. This method may further comprise biasing the driver with a biasing element such that the DC components are blocked from the biasing element by the first impedance element.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

Figure 2A:
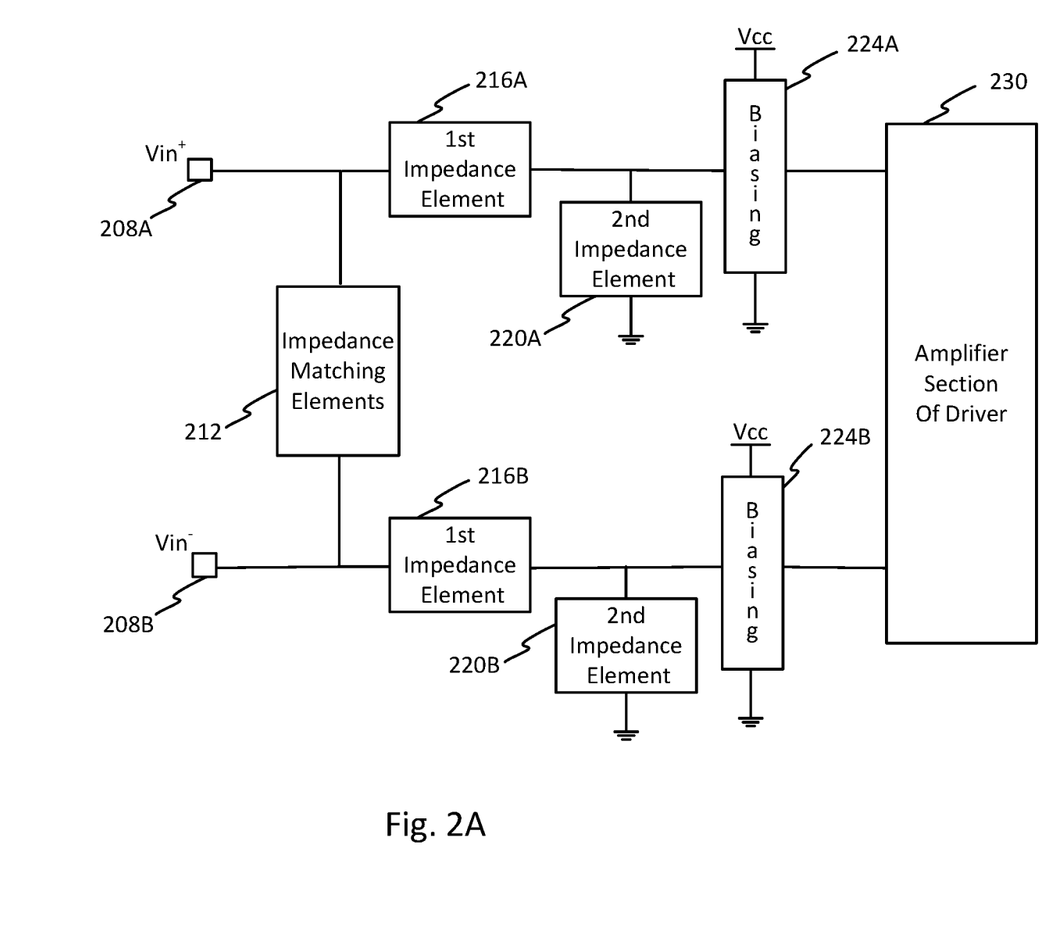
FIG. 2A is a block diagram of an example embodiment of an integrated circuit located coupling capacitor arrangement for a differential signal.

FIG. 2A illustrates a block diagram of a capacitor coupling system that avoids use of external blocking capacitors. This is but one possible block diagram configuration and it is contemplated that other arrangement of elements are possible that do not depart from the claimed innovation or the scope of the improvement over the prior art. This is a differential pair configuration and as such the upper signal path is discussed in detail. The lower signal path is generally identical and symmetric to the upper path. As shown, two inputs Vin⁺ 208A and Vin⁻ 208B are shown to receive the incoming differential signal. Connected to each of the input terminals 208A, 208B are one or more impedance matching elements 212. In one embodiment, these elements comprise one or more resistors and one or more capacitors. In other embodiments, other elements may be included or left out. The impedance matching element 212 is configured to match the input impedance of the driver amplifier 120 to the data source 104 providing the signals to the inputs Vin⁺ 208A and Vin 208B to avoid reflection and minimize return loss. In some embodiments the input impedance may be 50 ohms. The input impedance seen at Vin⁺ 208A depends on the combination of the impedance matching elements 212 as well as the 1$^{st}$ impedance element 216A and 2$^{nd}$ impedance element 220A, and these three elements are tuned together to provide a desired through-response and input impedance.

Also connected to input Vin⁺ 208A is a first impedance element 216A. The output of the first impedance element 216A connects to a second impedance element 220A and a biasing element 224. The opposing terminal of the second impedance element 220A connects to ground. The first impedance element 216A and the second impedance element 220A form an impedance network, specifically a voltage divider or capacitor divider. The combination of the first impedance element 216A and the second impedance element 220A, both of which when combined as shown replace the large external blocking capacitor (also referred to as a coupling capacitor). Silicon is much more economical thus, integrating the blocking capacitor with the silicon driver lowers the total cost, as well as the size.

The input signal presented to the input Vin⁺ passes through the first capacitive element 216A toward the second capacitive element 220A. A portion of the input signal passes to ground through the second capacitive element 220A. The capacitors 216A appears as an open circuit to DC components of the input signal thereby blocking unwanted DC signal components from reaching and possibly disrupting the biasing element the amplifier section of the driver. The capacitor divider network 216A, 220A works across all frequencies. For example, defining the first impedance element 216A as Z1 and the second impedance element 220A as Z2, the following equation defines the output of the capacitance divider network: Vout=Z2/(Z1+Z2). When Z1=Z2, this equation can reduce to Z2/2Z2 which can be further reduced to ½. Fundamental to this invention is the idea of a capacitive divider, which in its ideal form works at all frequencies except for exactly DC. The math behind a capacitive divider shows that the impedance of a capacitor across frequency is Z=−j/[2*π*f*C]. Therefore the above example could be written as $$V\text{out} = V\text{in} * \frac{Z2}{Z1+Z2} = V\text{in} * \frac{-\frac{1}{2*\pi*f*C2}}{-\frac{j}{2*\pi*f*C1} + -\frac{j}{2*\pi*f*C2}} =$$

$$V\text{in} * \frac{\frac{1}{C2}}{\frac{1}{C1}+\frac{1}{C2}} = V\text{in} * \frac{C1}{C1+C2}$$

As can be seen in the final equation, Vout depends only on the ratio of capacitances and is therefore frequency independent, which mean that ideally this circuit work as low as DC (excluding exactly DC which is undefined). Moreover, note that the actual size of the capacitor is not critical—the ratio of the capacitance is what matters. For example, if C1=C2=100 nF the ratio becomes ½. But, even if C1=C2=1 pF the ratio would still be ½. Both would pass all frequencies except DC equally well. Thus, whereas in an external blocking capacitor as a single element would need to be greater than 100 nF for sub 1 MHz operation, the capacitor divider topology as a ratio integrated on chip can achieve the same low frequency performance with a much smaller capacitance value. In practice, parasitics in the capacitors and the load on the output of the capacitive divider limit how low the capacitive divider works. However, modern semiconductor processes allow this network to work well below 1 MHz.

The biasing element 224 connects to a supply voltage Vcc and a ground terminal to provide biasing to amplifier section 230 of the driver. Any DC signal components received on the input 208A, 208B can interfere with the biasing element output or vice versa interfere with data source 104. As a result, it is preferable to block DC components with the AC coupling capacitor (also referred to as a DC blocking capacitor). Biasing elements 224A, 224B are generally known and as such are not described in detail herein. The output of the biasing element 224A connects to an amplifier section 230 of the driver 120. The amplifier section 230 amplifies the signal to a level suitable for driving the optic modulator and optic signal generator, such as a laser or diode. Although shown as a single amplifier, it is contemplated that each path (upper path and lower path) may have a separate amplifier. The lower path is generally similar to the upper path and as such is not described in detail.

Figure 2B:
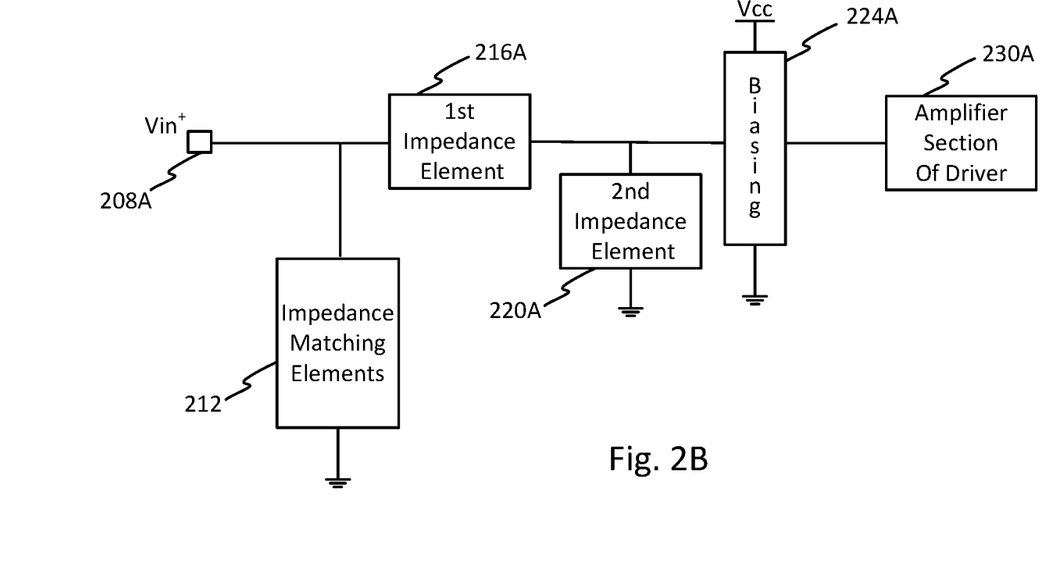
FIG. 2B is a block diagram of an example embodiment of an integrated circuit located coupling capacitor arrangement for a single ended signal.

FIG. 2B is a block diagram of an example embodiment of an integrated circuit located coupling capacitor arrangement for a single ended signal. As compared to FIG. 2A, similar elements are labeled with identical reference numbers. This embodiment is a singled ended configuration and as such, a single input 208A is provided. The impedance matching elements 212 may comprise any combination of elements, active or passive, to match the input impedance of driver to a data source. In other embodiments, other single ended configurations are possible that also benefit from an integrated voltage divider network that blocks DC signal components to avoid use of external capacitors.

Figure 3A:
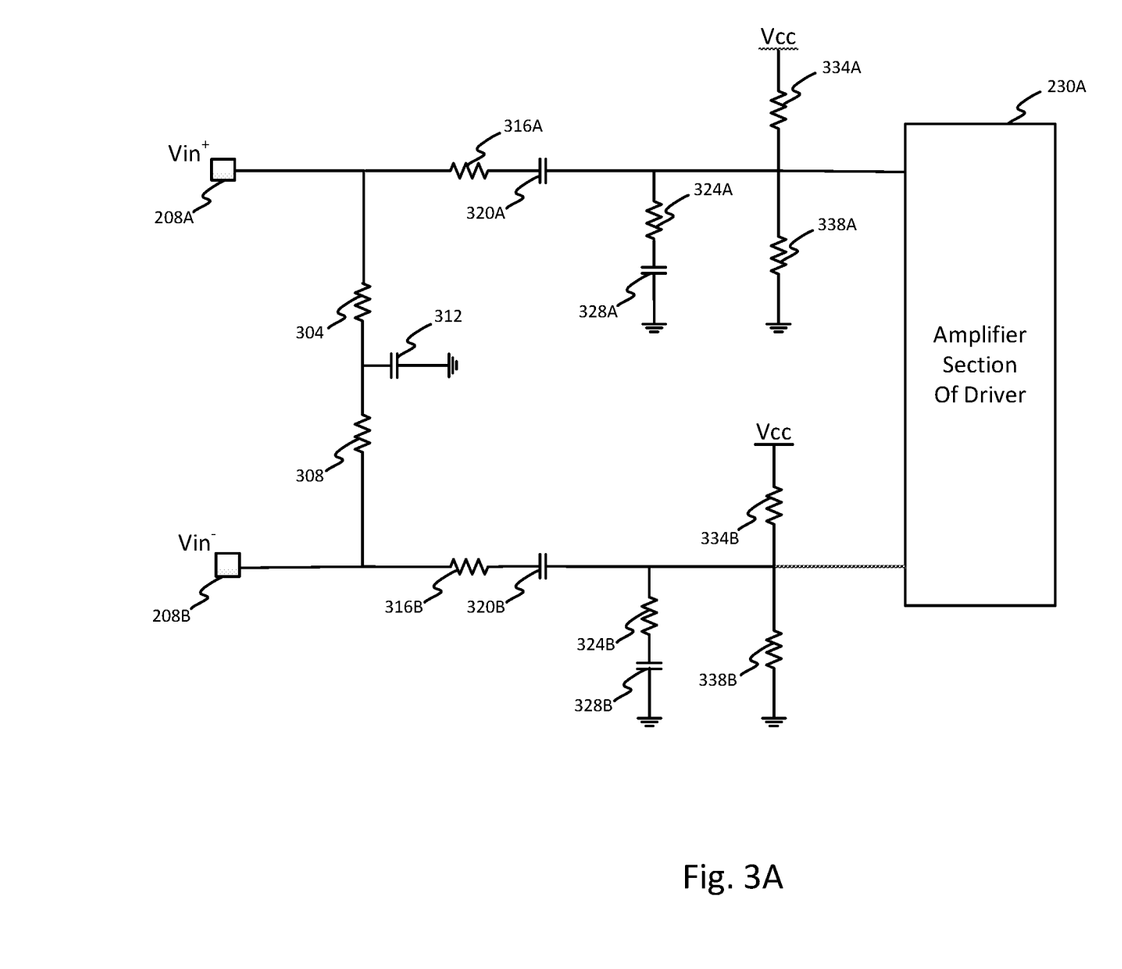
FIG. 3A is a circuit diagram of an integrated circuit located coupling capacitor arrangement for a differential signal.

FIG. 3A illustrates one example embodiment of a circuit diagram of FIG. 2A. This is but one possible circuit level configuration and it is contemplated that other embodiments and configurations are possible that do not depart from the scope of the invention. In this embodiment, the input Vin⁺ 208A connects to a first impedance matching resistor 304 and resistor 316A. The opposing terminal of impedance matching resistor 304 connects to a second impedance matching resistor 308 and a capacitor 312. The opposing terminal of the second impedance matching resistor 308 connects to the lower signal path, which is configured generally similar to or identical to the upper signal path.

The opposing terminal of resistor 316A connects in series with a capacitor 320A. The capacitor 320A opposing terminal connects to three different resistors, namely resistor 324A, and two resistors 334A, 338A of the biasing element. The opposing terminal of resistor 324A connects to capacitor 328A, which in turn connects to ground as shown. The resistor 316A and capacitor 320A form one impedance element of the DC block and the resistor 324A and capacitor 328A form the second impedance element of the DC block.

Biasing resistor 334A of the biasing element also connects to a supply voltage node Vcc while biasing resistor 338A connects to a ground terminal as shown. An amplifier section 230 connects to the biasing resistors 334A, 338A and is configured to amplify a received signal.

The resistors 304, 308 establish the low frequency input impedance. Resistors 304, 308 in conjunction with resistors 316A and 324A (and resistors 316B and 324B) establish the high frequency input impedance. In this embodiment, the resistor 316A and capacitor 320A form a first capacitive element and the resistors 324A and capacitors 328A for a second capacitive element and operate as a capacitor divider network to block DC signal components while also passing the signal in the frequency band of interest, such as from 1 MHz or lower (100 KHz) to 40 to 50 GHz or higher.

In response to DC or low frequency signal, capacitors 320A appears as an open circuit thereby preventing DC signal components from reaching the biasing elements and the capacitive element group 324A, 328A. As a result, the low frequency impedance looking into inputs 208A, 208B is determined by the resistors 304, 308, which in one embodiment is configured to be 100 ohms and, in another embodiment, to be 50 ohms. In response to a high frequency signal, the capacitors 320A, 328A appear as short circuits thereby passing the input signal to the amplifier section 230. A voltage divider may occur in some embodiments but in other embodiment the full magnitude of the input signal is provided to the amplifier 230. This voltage divider may increase linearity and thus in certain embodiments this is a further benefit of the present innovation based on this additional flexibility. The resistors 304, 308 are still part of the circuit for high frequency signals and establish part of the impedance matching. The high frequency input impedance match for the input leg 208A appears as the resistor 304 in parallel with resistor 316A in series with resistor 324A, or $Z_{208A}=R_{304}||(R_{316A}+R_{324A})$. A similar relationship holds for input 208B and resistors 308, 316B, and 324B where $Z_{208B}=R_{308}||(R_{316B}+R_{324B})$. A specific embodiment of this could be if $R_{304}=100\Omega$, $R_{316A}=50\Omega$, and $R_{324A}=50\Omega$, in which $Z_{208A}=100\Omega||(50\Omega+50\Omega)=50\Omega$.

Figure 3B:
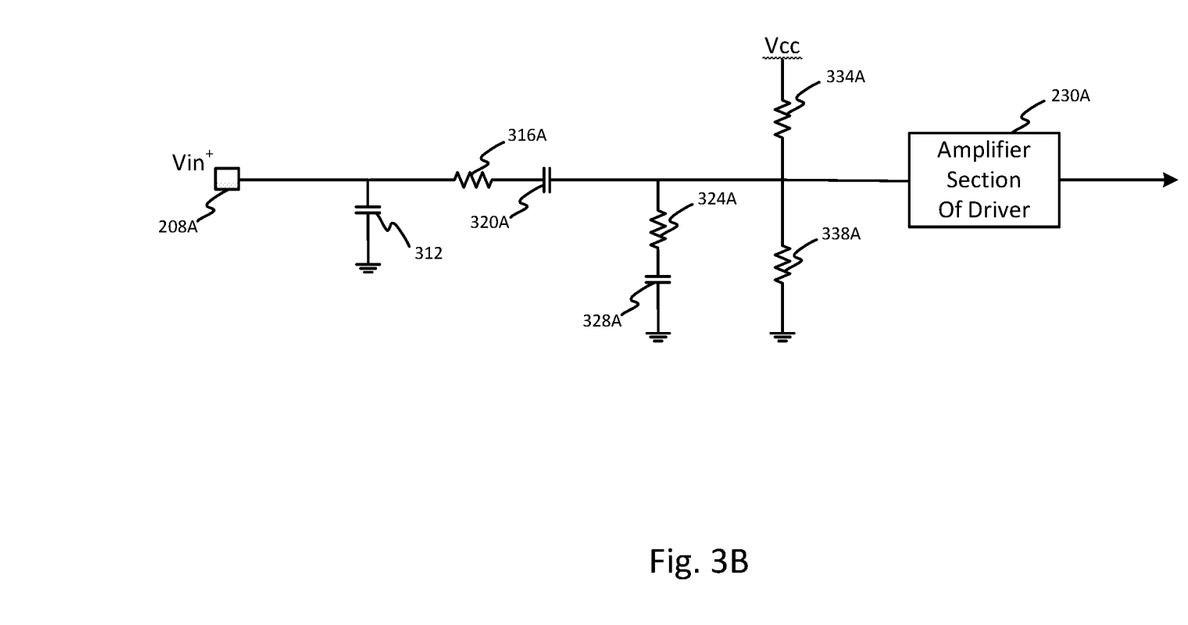
FIG. 3B is a circuit diagram of an integrated circuit located coupling capacitor arrangement for a single ended signal.

FIG. 3B is a circuit level diagram of an example embodiment of an integrated circuit located coupling capacitor arrangement for a single ended signal. As compared to FIG. 2A, similar elements are labeled with identical reference numbers. This embodiment is a singled ended configuration and as such, a single input 208A is provided. The impedance matching element 312 may comprise any combination of elements, active or passive, to match the input impedance of driver to a data source. In this embodiment the impedance matching element 312 is a capacitor. In other embodiments, other single ended configurations are possible that also benefit from an integrated voltage divider network that blocks DC signal components to avoid use of external capacitors.

Figure 4:
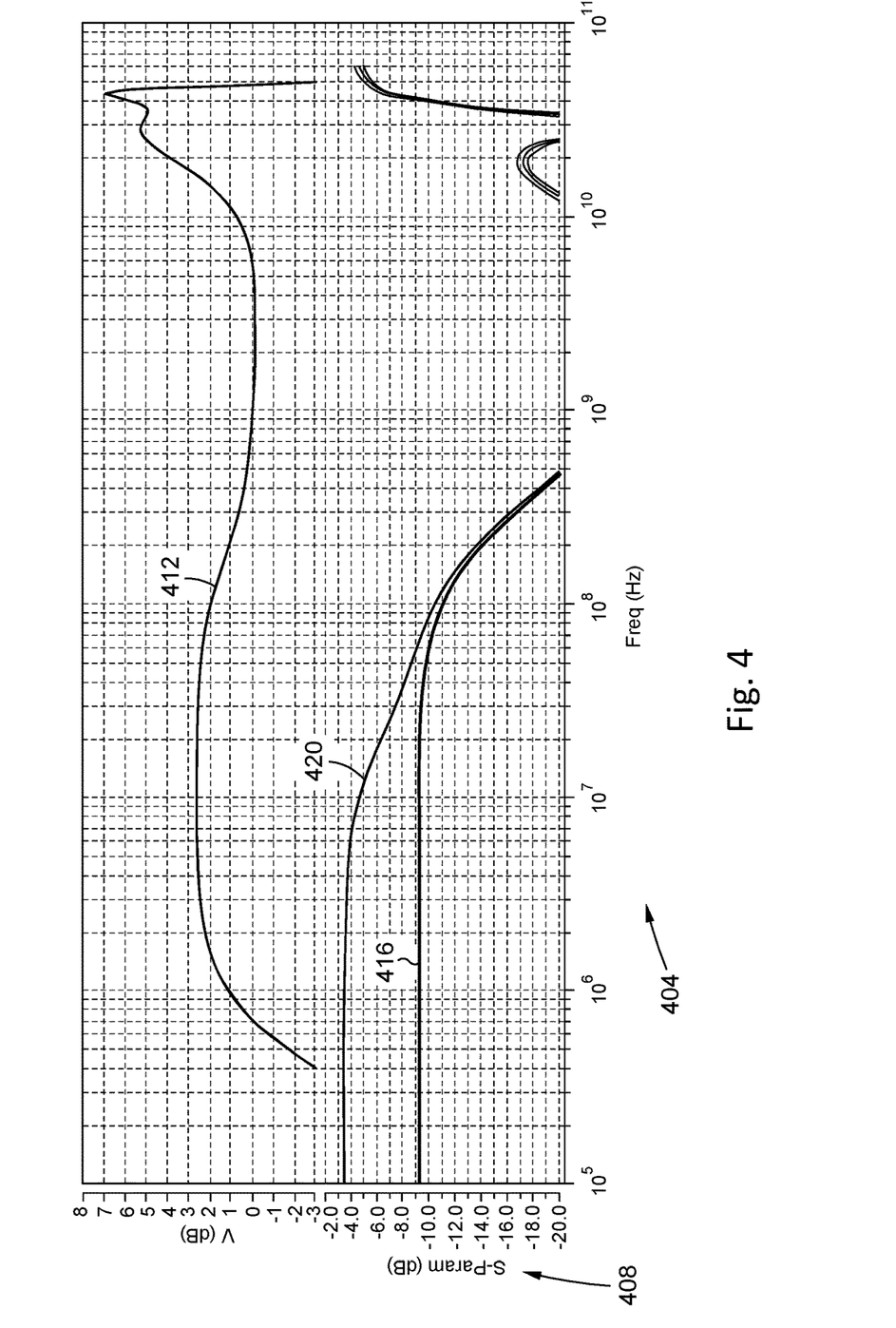
FIG. 4 illustrates signal plots of a signal and return loss.

FIG. 4 illustrates a signal plot showing the performance of the embodiment of FIGS. 3A and 3B. In this plot the horizontal axis 404 represents frequency and the vertical axis 408 represents voltage ratios in dB. Signal line 412 represents the signal passing through the integrated circuit located coupling capacitors. As can be seen, the circuit has a good AC response at low frequencies, passing signals as low as 400 kHz (−3 dB cutoff) in this embodiment. Thus, this innovation achieves the goal of passing low frequency components in the frequency band of interest while blocking DC signal components at frequencies below the band of interest. Thus, the system serves as a successful signal block using the capacitive divider network described herein without the need for a large external blocking capacitor. Signal plot 416 represents the return loss of the capacitive structure and impedance matching features of the innovation shown in FIGS. 2A and 3A for differential signals/structure. Signal plot 420 represents the return loss of the capacitive structure and impedance matching features of the innovation shown in FIGS. 2B and 3B for singled ended signals/structure.

A low return loss is preferred and is an indication of the quality of the impedance matching. As can be seen, the return loss S 11 is acceptable at low frequency, passing about 90% of the signal power and reflecting about 10% (reflection coefficient S11 is −10 dB or $1/10^{th}$ of the incoming power) while being very low at higher frequencies. Thus, this innovative design also performs well from a return loss perspective.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A capacitive coupling system configured for differential signals as part of an integrated circuit to block DC components from an amplifier comprising:
    a positive path comprising:
        a positive path input configured to receive an input signal, the input signal having a DC component;
        a positive path voltage divider network having an input, an output, at least one resistor connected in series with at least one capacitor, the input configured to receive the signal having a DC component such that the voltage divider network blocks the DC component, wherein the positive path voltage divider network comprises a first impedance element and a second impedance element;
    a negative path comprising:
        a negative path input configured to receive a negative path signal which has a DC component connected;
        a negative path voltage divider network having an input, an output, at least one resistor connected in series with at least one capacitor, the input configured to receive the signal having a DC component such that the negative path voltage divider network blocks the DC component, wherein the negative path voltage divider network comprises a first impedance element and a second impedance element;
    an impedance matching element comprising an interconnect between the positive path input and the negative path input, the interconnect comprising one or more resistors, connected between the positive path input and the negative path input, and a capacitor connected from the interconnect to ground, the impedance matching element configured to match an input impedance of the amplifier to a data source; and
    the amplifier, which includes a biasing element, has an input that receives the input signal without the DC component from the positive path voltage divider network and the negative path voltage divider network.

2. The system of claim 1 wherein the biasing element includes a first resistor connected to a supply voltage and a second resistor connect to ground.

3. The system of claim 1 wherein the impedance matching element comprises one or more resistors connected in series between the input of the positive path and the negative path input and a capacitor connected to ground.

4. A capacitive coupling system configured as part of an integrated circuit for a differential pair to couple differential inputs to an amplifier, the system comprising:
   a positive path comprising:
      a positive path input configured to receive a positive path input signal, the positive path input signal having a DC component;
      a positive path first impedance element having an input and an output, the input configured to receive the positive path input signal such that the positive path first impedance element blocks the DC component, wherein the positive path first impedance element comprises a resistor in series with a capacitor;
      a positive path second impedance element configured to connect between the output of the positive path first impedance element and ground, the positive path second impedance element when combined with the positive path first impedance element form a voltage divider network;
   a negative path comprising:
      an input configured to receive a negative path input signal, the negative path input signal having a DC component;
      a negative path first impedance element having an input and an output, the input configured to receive the negative path input signal such that the negative path first impedance element blocks the DC component, wherein the negative path first impedance element comprises a resistor in series with a capacitor;
      a negative path second impedance element configured to connect between the output of the negative path first impedance element and ground, the negative path second impedance element when combined with the negative path first impedance element form a voltage divider network;
   the amplifier, which includes a biasing element, has having an input connected to the output of the negative path first impedance element and the output of the positive path first impedance element, and the amplifier receives the input signal without the DC component; and
   an impedance matching element comprising resistors connected between the positive path input and the negative path input and a capacitor connected to ground, the impedance matching element configured to match an input impedance of the amplifier to a data source.

5. The system of claim 4 further comprising a resistor and capacitor configured as part of the positive path second impedance element wherein the resistor and capacitor are in series and connect to a ground node.

6. The system of claim 5 wherein the resistor comprises two resistors connected in series between the positive path input and the negative path input forming a middle node between the two resistor and the capacitor connects to the middle node and ground.

7. A method for coupling an input signal, connected a data source, to a driver and blocking DC components of an input signal comprising:
   receiving the input signal from the data source, the input signal having a DC component;
   providing the input signal to a first impedance element which comprises a resistor in series with a capacitor, the first impedance element configured as part of an integrated circuit;
   blocking the DC component of the input signal with the first impedance element;
   providing an output from the first impedance element to a second impedance element which comprises a resistor in series with a capacitor, the second impedance element configured as part of the integrated circuit;
   establishing the input impedance with the second impedance element and the first impedance element to create an impedance matched signal;
   providing the impedance matched signal to the driver.

8. The method of claim 7 wherein the input signal is a differential signal pair comprising a first signal on a first path and a second signal on a second path, the second path identical to the first path, the first and second path each having the first impedance element, comprising a resistor in series with a capacitor and the second impedance element and further comprising matching the input impedance of the driver to the data source with an impedance matching element comprising a first resistance and a second resistance connected in series between the first path and the second path and a capacitor having a first terminal connected between the first resistance and a second resistance and a second terminal connected to ground.

9. The method of claim 7 wherein the method does not block DC components with a capacitor that is external to the integrated circuit.

10. The method of claim 7 further comprising biasing the driver with a biasing element such that the DC components are blocked from the biasing element.

11. A method for coupling an input signal, connected a data source, to a driver and blocking DC components of an input signal comprising:
   receiving the input signal on an input path from the data source, the input signal having a DC component;
   providing the input signal to a first impedance element which comprises a resistor in series with a capacitor, the first impedance element configured as part of an integrated circuit;
   blocking the DC component of the input signal with the first impedance element;
   providing an output from the first impedance element to a second impedance element, the second impedance element has a resistor in series with a capacitor and is configured as part of the integrated circuit;
   providing the input signal to an impedance matching interconnect that interconnects the input path to either a second input path or ground node, the impedance matching interconnect comprising either a capacitor connected to ground or two or more resistors connected in series with a capacitor connected to ground;
   establishing the input impedance with the impedance matching interconnect, the first impedance element, and the second impedance element to create an impedance matched signal; and
   providing the impedance matched signal to the driver.

\* \* \* \* \*